(12) United States Patent
Gascon Rivera

(10) Patent No.: US 10,132,662 B2
(45) Date of Patent: Nov. 20, 2018

(54) CLUSTER ILLUMINATION BY PIEZOELECTRIC MATERIAL

(71) Applicant: Continental Automotive Systems, Inc., Auburn Hills, MI (US)

(72) Inventor: Maria Cristina Gascon Rivera, Guadalajara (MX)

(73) Assignee: Continental Automotive Systems, Inc., Auburn Hills, MI (US)

(*) Notice: Subject to any disclaimer, the term of this patent is extended or adjusted under 35 U.S.C. 154(b) by 14 days.

(21) Appl. No.: 15/216,186

(22) Filed: Jul. 21, 2016

(65) Prior Publication Data

US 2017/0023387 A1  Jan. 26, 2017

Related U.S. Application Data

(60) Provisional application No. 62/196,056, filed on Jul. 23, 2015.

(51) Int. Cl.
| | |
|---|---|
| *G01D 11/28* | (2006.01) |
| *G01D 13/28* | (2006.01) |
| *B60K 37/02* | (2006.01) |
| *G01D 13/02* | (2006.01) |

(52) U.S. Cl.
CPC .............. *G01D 13/28* (2013.01); *B60K 37/02* (2013.01); *G01D 11/28* (2013.01); *B60K 2350/203* (2013.01); *B60K 2350/402* (2013.01); *B60K 2350/408* (2013.01); *G01D 13/02* (2013.01)

(58) Field of Classification Search
CPC ............. G01D 13/22–13/28; B60Q 3/10–3/18
See application file for complete search history.

(56) References Cited

U.S. PATENT DOCUMENTS

2012/0060747 A1* 3/2012 Farell ..................... H02N 2/163
116/286

FOREIGN PATENT DOCUMENTS

| DE | 102013006124 A1 | 10/2014 |
| JP | 2009168598 A | 7/2009 |

OTHER PUBLICATIONS

Extended Search Report dated Mar. 21, 2017 from corresponding European Patent Application No. 16180847.2.

* cited by examiner

*Primary Examiner* — Sean Gramling

(57) ABSTRACT

An instrument cluster for a motor vehicle includes a dial surface having a plurality of indicia located thereon. A pointer contacts the dial surface and is configured to rotate with respect to the dial surface. Piezoelectric material is disposed on one of the dial surface and the pointer. The piezoelectric material is configured to deform due to contact between the pointer and the dial surface.

16 Claims, 3 Drawing Sheets

CLUSTER ILLUMINATION BY PIEZOELECTRIC MATERIAL

CROSS REFERENCE TO RELATED APPLICATION

This application claims the benefit of provisional patent application No. 62/196,056, filed Jul. 23, 2015, which is hereby incorporated by reference.

FIELD

The present disclosure relates to vehicle instrument panels and clusters, and more specifically to lighting of an instrument cluster in a motor vehicle.

BACKGROUND

Vehicles include instrument panels to communicate information indicative of operation to an operator. For example, motor vehicles may include instrument panels with several gauges and dials that communicate vehicle conditions such as speed, engine rpm, temperature, and oil pressure, among other operational parameters. A pointer is typically provided that rotates about a fixed axis to communicate current values of an operational parameter.

An instrument panel and gauge is a functional element of a vehicle dashboard, but also contributes to the aesthetic appearance and impression of the vehicle. Light guides and multiple LEDS are typically assembled with a housing to distribute light to the face of the instrument cluster. Each LED requires electronics associated with it.

Accordingly, designers are continually seeking different configurations to improve the appearance of the instrument panel, while maintaining the required functionality, without significantly increasing the cost.

SUMMARY

An instrument cluster assembly is provided that uses piezoelectric material for illumination, thereby decreasing the number of LEDs and associated electronics necessary to provide a desirable aesthetic appearance.

In one form, which may be combined with or separate from the other forms disclosed herein, an instrument cluster for a motor vehicle is provided. The instrument cluster includes a dial surface comprising piezoelectric material. A plurality of indicia is located on the dial surface, the piezoelectric material overlapping with each indicia of the plurality of indicia. A pointer is configured to rotate with respect to the dial surface. The pointer is configured to contact the piezoelectric material as the pointer rotates with respect to the dial surface.

In another form, which may be combined with or separate from the other forms disclosed herein, an instrument cluster for a motor vehicle is provided. The instrument cluster includes a dial surface and a plurality of indicia located on the dial surface. A pointer contacts the dial surface. The pointer is configured to rotate with respect to the dial surface. Piezoelectric material is disposed on the dial surface or the pointer. The piezoelectric material is configured to deform due to contact between the pointer and the dial surface.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
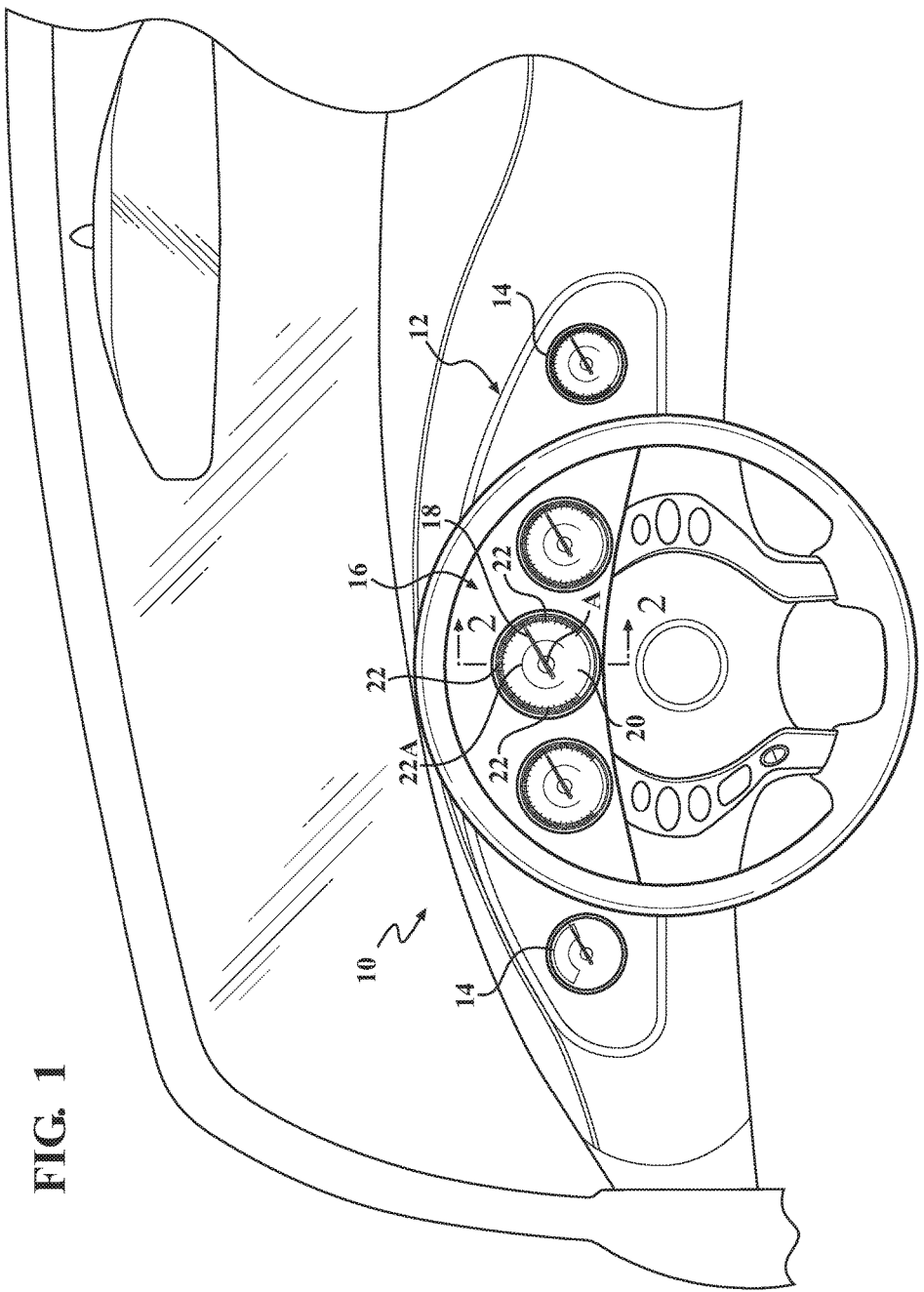
FIG. 1 is a schematic front view of an example vehicle dashboard and instrument cluster assembly, in accordance with the principles of the present disclosure.

Referring to the FIG. 1, a vehicle dashboard 10 includes an instrument panel 12 including a main instrument cluster assembly 16 and several secondary gauges 14. The main instrument cluster assembly 16 includes a pointer assembly 18 that rotates about an axis A extending through a dial surface 20 to indicate a specific operating parameter. Information given by the instrument cluster assembly 16 may include, by way of example, tachometer information, vehicle speed information, fuel level information, engine temperature, or any other information that is desired to communicate to the driver of the vehicle. Several indicia 22, such as speed values, are located on the dial surface 20. The indicia may be laser etched or cut into the dial surface 20, by way of example.

Figure 2:
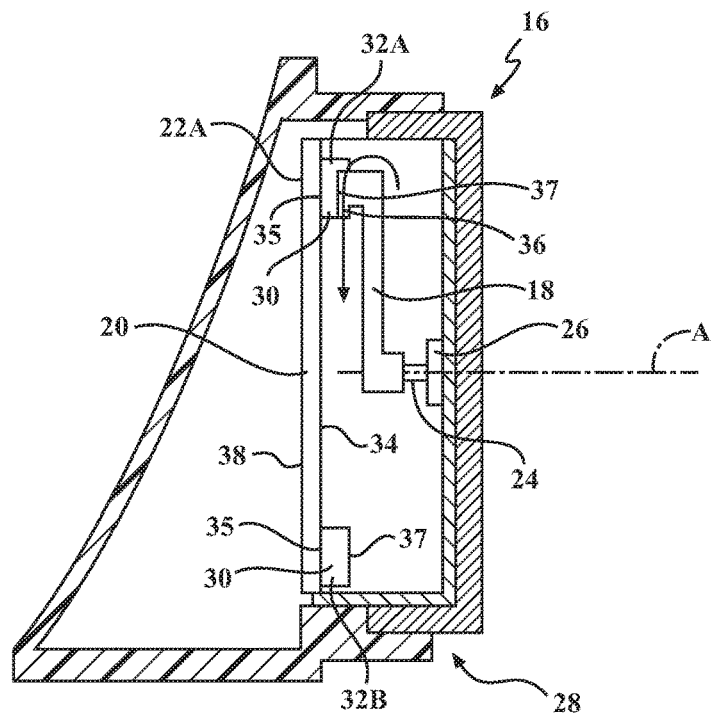
FIG. 2 is a cross-sectional side view of the instrument cluster assembly shown in FIG. 1, taken along the line 2-2, according to the principles of the present disclosure.

Referring to FIGS. 1-2, the pointer 18 is configured to rotate with respect to the dial surface 20, about the axis A. For example, the pointer assembly 18 may be mounted to a shaft 24 that is driven by a stepper motor 26. The stepper motor 26 may be mounted to a printed circuit board (not shown) and includes the shaft 24 that extends upwardly to support the pointer assembly 18. A light housing 28 surrounds the axis A and the shaft 24, as well as the pointer assembly 18 and the dial surface 20. The light housing 28 provides for the blocking or confinement of light as it propagates forward through the dial surface 20.

Figure 3:
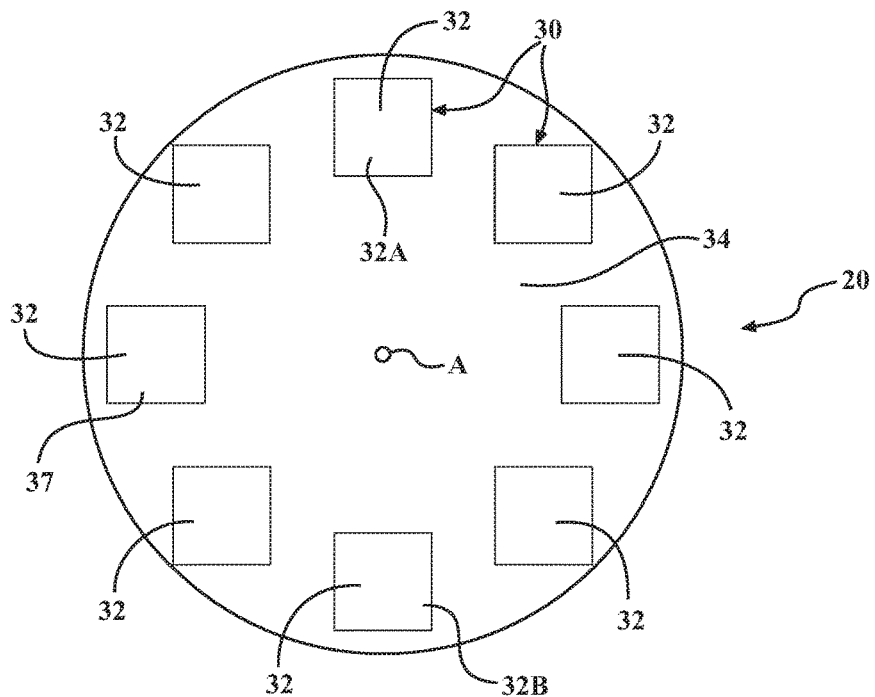
FIG. 3 is a rear view of a dial surface of the instrument cluster assembly shown in FIGS. 1 and 2, in accordance with the principles of the present disclosure.

Referring to FIGS. 2-3, the dial surface 20 comprising piezoelectric material 30. In this example, the piezoelectric material 30 includes a plurality of pieces 32 of piezoelectric material 30 disposed on the rear face 34 of the dial surface 20, though it should be understood that other configurations of the piezoelectric material 30 may be used, without falling beyond the spirit and scope of the present invention. The piezoelectric material 30 is configured to accumulate electric charge in response to an applied mechanical stress. The piezoelectric material 30 illuminates in response to the accumulation of electric charge. The pointer 18 is configured to contact the piezoelectric material 30 as the pointer 18 rotates with respect to the dial surface 20. Thus, the piezoelectric material 30 is configured to illuminate upon contact by the pointer 18.

More particularly, each piece 32 of piezoelectric material 30 has a front side 35 that is adhered to the rear side 34 of the dial surface, for example, with glue. The pointer 18 is configured to contact back sides 37 of the pieces 32. When the pointer 18 contacts one of the back sides 37, the piezoelectric piece 32 is illuminated, which shines through the front side 35 of the piece 32. When a piece 32 is illuminated, the illumination shows through the front face 38 of the dial surface through one of the indicia 22, as explained below.

The piezoelectric material 30 overlaps with the indicia 22. For example, each piece 32 of piezoelectric material may overlap with one indicium 22. The pointer 18 is configured to rotate about the axis A and to contact each piece 32 of piezoelectric material 30. For example, the pointer 18 is configured contact a first piece 32A of the plurality pieces 32 of piezoelectric material 30 in a first position (shown in FIG. 2). When in the first position, the piezoelectric material illuminates due to the stress placed on it by the tip 36 of the pointer 18. The other pieces 32 of piezoelectric material 30 remain free from illumination when the pointer 18 is in the first position because the pointer 18 does not contact the other pieces 32 (except for the first piece 32A) in the first position. Since a first indicium 22A of the plurality of indicia 22 overlaps with the first piece 32A of piezoelectric material 30, the first indicium 22A is illuminated when the pointer 18 is in the first position. Although the pointer 18 is shown in an upright position as the first position, it should be understood that any other position of the pointer 18 contacting a piece 22 of piezoelectric material 30 could be considered the "first" position, without falling beyond the spirit and scope of the present invention.

The pointer 18 is then configured to move to another position, a "second" position, wherein the pointer 18 contacts a second piece 32B of piezoelectric material 30, for example. The second piece 32B is shown 180 degrees from the first piece 32A at a bottom part of the dial surface 20, however, it should be understood that any other position could be considered the "second position." In this example, the pointer 18 moves into contact with the second piece 32B of piezoelectric material 30 in the second position. Any indicium 22 that overlaps with the second piece 32B of piezoelectric material 30 would be illuminuated then, when the pointer 18 is in the second position. When the pointer 18 is in the second position, the first piece 32A and all other pieces 32 (other than the second piece 32B) of piezoelectric material 30 remain free from illumination.

When one of the pieces 32 of piezoelectric material 30 is illuminated upon contact with the pointer 18, the corresponding overlapping indicium 22 is illuminated by the illuminated piece 32 of piezoelectric material, which can be seen on the front face 38 of the dial surface 20. This occurs, for example, because each indicium 22 could be cut, laser etched, or otherwise provided as a transparent or translucent window through the dial surface 20.

Figure 4:
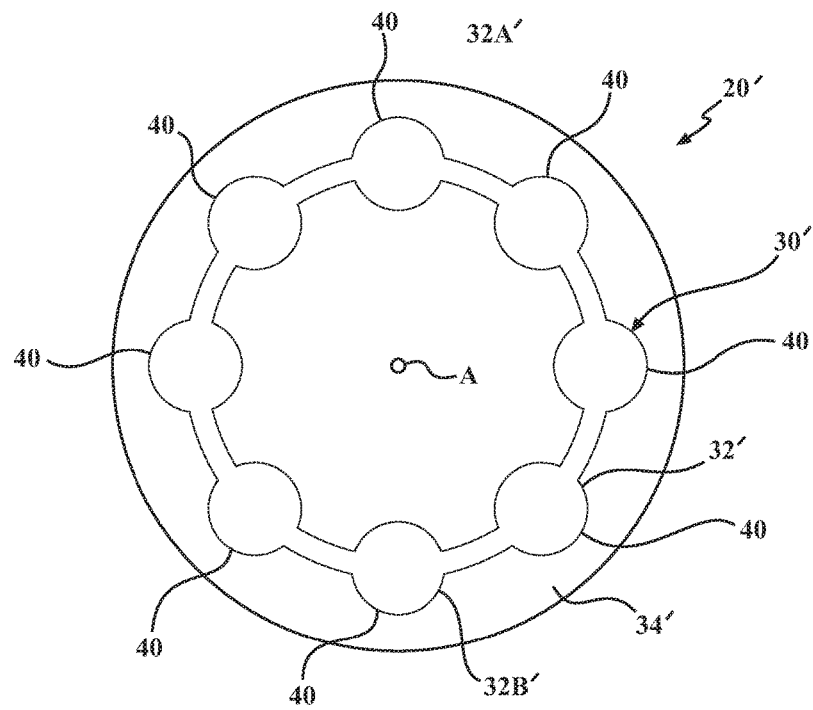
FIG. 4 is a rear view of another dial surface that can be used with the instrument cluster assembly shown in FIGS. 1 and 2, according to the principles of the present disclosure.

Referring now to FIG. 4, another variation of piezoelectric material 30' is illustrated as being disposed on the dial surface 20'. In this variation, the piezoelectric material 30' is shown as a single, unitary piece 32' that is disposed, such as by being glued, onto the rear face 34' of the dial surface 20. The single piece 32' of piezoelectric material 30' has various portions 32A', 32B' that the pointer 18 contacts in order to light up the various indicia 22, as described above. The single piece 32' has bulges 40 at each place that overlaps with an indicium 22, but it should be understood that the piezoelectric material 30' could have other shapes, such as a standard annulus or ring shape.

Figure 5:
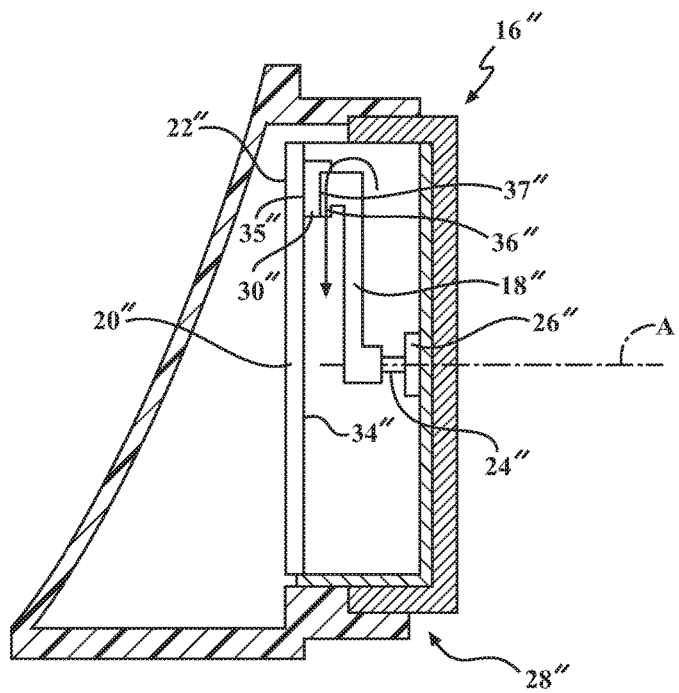
FIG. 5 is a cross-sectional side view of the instrument cluster assembly shown in FIG. 1, taken along the line 2-2, showing a variation of the pointer, according to the principles of the present disclosure.

Referring now to FIG. 5, another variation of the instrument cluster assembly 16" is illustrated. Like the instrument cluster assembly 16 shown and described above, the instrument cluster assembly 16" has a housing 28", a dial surface 20", and a stepper motor assembly 26". In this variation, however, the piezoelectric material 30" is disposed on the tip 36" of the pointer 18". Thus, the tip 36" is adhered, such as by glue, to a back face 37" of a piece of piezoelectric material 30", and a front face 35" of the piezoelectric material 30" contacts the rear face 34" of the dial surface 20". In this version, the dial surface 20" need not include any piezoelectric material adhered to the dial surface 20". The pointer 18" may be configured to always contact the rear face 34" of the dial surface 20" so that the piezoelectric material 30" is always compressed enough to illuminate the piezoelectric material 30". Therefore, the illumination will be located wherever the tip 36" of the pointer 18" is located around the range of motion of the pointer tip 36". Whenever the pointer 36" overlaps with one of the indicia 22", the illumination will shine through the dial surface 20", as explained above.

It is further understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. An instrument cluster for a motor vehicle, the instrument cluster comprising:

a dial surface comprising piezoelectric material;

a plurality of indicia located on the dial surface, the piezoelectric material overlapping with each indicia of the plurality of indicia; and a pointer configured to rotate with respect to the dial surface, the pointer being configured to contact the piezoelectric material as the pointer rotates with respect to the dial surface;

wherein the piezoelectric material is configured to illuminate upon contact by the pointer.

2. The instrument cluster of claim 1, wherein the piezoelectric material comprises a plurality of portions of piezoelectric material, the pointer being configured to contact a first portion of the plurality of portions of piezoelectric material in a first position, the pointer being configured to contact a second portion of the plurality of portions of piezoelectric material in a second position, the first portion of the piezoelectric material configured to illuminate when the pointer is in the first position while the second portion remains free from illumination when the pointer is in the first position, the second portion of the piezoelectric material configured to illuminate when the pointer is in the second position while the first portion remains free from illumination when the pointer is in the second position.

3. The instrument cluster of claim 2, wherein a first indicium of the plurality of indicia overlaps with the first portion of piezoelectric material and a second indicium of the plurality of indicia overlaps with the second portion of piezoelectric material, the first indicium being illuminated when the pointer is in the first position and the second indicium being illuminated when the pointer is in the second position.

4. The instrument cluster of claim 3, the dial surface having a front face and a rear face, the piezoelectric material being disposed on the rear face of the dial surface.

5. The instrument cluster of claim 4, the piezoelectric material having a front side and a back side, the front side being attached to the dial surface, the pointer being configured to contact the back side of the piezoelectric material.

6. The instrument cluster of claim 5, further comprising a housing disposed around the dial surface.

7. The instrument cluster assembly of claim 6, wherein the plurality of indicia are laser etched into the dial surface.

8. The instrument cluster assembly of claim 6, wherein the plurality of indicia are cut into the dial surface.

9. The instrument cluster assembly of claim 6, wherein the piezoelectric material is a single layer of material disposed on the rear face of the dial surface.

10. The instrument cluster assembly of claim 6, wherein the piezoelectric material comprises a plurality of pieces of piezoelectric material disposed on the rear face of the dial surface, the first portion being part of a first piece of the plurality of pieces of piezoelectric material, and the second portion being part of a second piece of the plurality of pieces of piezoelectric material.

11. The instrument cluster assembly of claim 6, wherein the piezoelectric material is glued to the rear face of the dial surface.

12. An instrument cluster for a motor vehicle, the instrument cluster comprising:
a dial surface;
a plurality of indicia located on the dial surface;
a pointer contacting the dial surface, the pointer comprised of piezoelectric material disposed on the pointer, and configured to deform due to contact between the pointer and the dial surface and being configured to rotate with respect to the dial surface; and
wherein the piezoelectric material is configured to illuminate when deformed.

13. The instrument cluster of claim 12, wherein the pointer is configured to rotate to contact a first indicium of the plurality of indicia in a first position and a second indicium of the plurality of indicia in a second position, the pointer illuminating the first indicium in the first position and the second indicium in the second position.

14. The instrument cluster of claim 13, further comprising a housing disposed around the dial surface.

15. The instrument cluster assembly of claim 14, wherein the plurality of indicia are one of: laser etched into the dial surface and cut into the dial surface.

16. The instrument cluster assembly of claim 14, wherein the pointer comprising a pointer main portion, the piezoelectric material being formed as a piezoelectric layer, the piezoelectric layer being glued to the pointer main portion.

* * * * *